United States Patent Office 3,428,488
Patented Feb. 18, 1969

3,428,488
PROCESS FOR THE SURFACE TREATMENT OF PLANTS CONTAINING WATER AND/OR STEAM
Paul Joan Peter van Dillen, Simpelveld, Netherlands, Eva Maria Vollmer, Hilden, Herbert Kallfass, Cologne-Stammheim, and Max Zimmermann, Ostrach, Hohenzollern, Germany, assignors to Borg Holding Aktiengesellschaft, Zug, Switzerland, a corporation of Switzerland, and Farbenfabriken Bayer Aktiengesellschaft, Leverkusen, Germany, a corporation of Germany
No Drawing. Filed Dec. 22, 1965, Ser. No. 515,729
U.S. Cl. 134—3                      11 Claims
Int. Cl. C01g 49/00

ABSTRACT OF THE DISCLOSURE

Process for the protection of ferrous metal surfaces which comprises pickling wall surfaces with oxidizing and reducing substances by the steps of cleaning with organic acid, converting Fe II to Fe III and finally enhancing the protective layer by contact with hydrazine and a reaction accelerator.

---

The present invention relates to a process for the surface treatment of water-containing and/or steam-containing plants substantially consisting of iron or steel, in particular boiler plants and pipe systems the walls of which are to be protected against corrosion.

The service life and the working efficiency of boiler plants substantially depends on the inside surface thereof, on the one hand, in order to avoid corrosion and, on the other hand, in order to maintain the heat transfer between the source of energy and the transfer medium at an optimum, and finally in order to insure in the operation of turbines a constant generation of steam of sufficient quality. It is therefore necessary both before starting operation and from time to time during operation, to remove from the boiler plants as well as the piping thereof any scale layers and other deposits and then to provide the boiler plants and the piping with a resistant protective layer.

In the cleaning and pickling process the scale layers consisting of iron oxides and alloying constituents thereof as well as other deposits are to be removed from the wall of the plants without the metal base layer therebeneath being attacked. Besides, the removed deposits are to be converted into a soluble form in order to prevent any sludge formation. These requirements are not fully met by the dilute inorganic acids previously used for cleaning and pickling. Therefore, they have been more recently replaced by organic acids which are capable of forming water-soluble complexes with heavy metals. The use of these organic acids has the additional advantage that the attack on the metal surface can be more easily controlled, optionally with the addition of inhibitors, e.g. nitrogen bases. As compared with the inorganic acids exhibiting a considerable cleaning effect, the organic acids, e.g. hydroxy carboxylic acids, suffer from the disadvantage that satisfactory pickling taken a relatively long period of time.

In the cleaning and pickling of boiler plants by modern processes the treatment in an acid medium is followed by an alkaline treatment with oxidizing substances which simultaneously exhibit a passivating action on the iron or steel surface, in order to enhance dissolution of the deposits and impurities. Most hydroxy carboxylic acids, e.g. citric acid which has frequently been used for this purpose, bind per each mol 1 mol of Fe (II), but 4 mols of Fe (III). By this treatment in a weak alkaline medium the loosely adhering oxide residue retained in the first step of the process is to be removed from the walls of the plants. However, a thin firmly adhering oxide layer—primarily consisting of iron(II)-oxide—must be preserved. This oxide layer is converted into $Fe_2O_3$ under the oxidizing conditions in the alkaline medium. There follows frequently a treatment step with reducing substances, e.g. hydrazine and dithionite, in order to convert $Fe_2O_3$ into magnetite, i.e. the protective layer.

The requirements to be fulfilled by the aforedescribed processes are very high. Besides the conditions outlined above, the quantity of the chemicals to be used should be kept as small as possible, in particular on account of the dimensions of modern high-capacity plants. Therefore the complex-forming potential of the chemicals to be used should be considerable. In order to minimize the necessary rinsing operations with pure water, the treatment throughout all stages of the process should be performed in the same medium, if possible, that means with a single charge of the plant and by subsequently adding the necessary reagents. Finally, the time of reaction in all stages should be as short as possible to insure an economic process both in view of the pickling operation and the inoperative period of the plant.

It has therefore been proposed to shorten the period required for pickling and cleaning by a combination of certain hydroxy carboxylic acids or esters and salts thereof with substituted amino carboxylic acids. By suitable choice of these synergistically effective combinations the after-treatment, by oxidation of the surfaces to be treated in an alkaline medium, e.g. chromates and nitrites, can advantageously be carried out in the solution used for pickling without the necessity of using a large excess of hydroxy carboxylic acids, in particular as a complex-forming acid is selected which forms a sufficiently stable iron complex, also in an alkaline medium.

It has further been proposed to enhance the protective effect of hydrazine in plants containing water or steam by addition of suitable activators. Suitable activating substances for this purpose include methylene-blue and complex heavy metal cyanides or mixtures of these two substances.

It is an object of the present invention to overcome the previous drawbacks encountered in the surface treatment of water-containing and/or steam-containing plants substantially consisting of iron and steel, and to provide for a more effective pickling and cleaning of such plants.

It is a further object of the present invention to provide a new process for the production of protective layers in water-containing and/or steam-containing plants substantially consisting of iron or steel by pickling with organic acids and subsequent treatment with oxidizing and/or reducing substances without the necessity of replacing the treating medium.

Further objects will become apparent as the following description proceeds:

The objects of the present invention are accomplished by a new process for the production of protective layers in water-containing and/or steam-containing plants substantially consisting of iron or steel, i.e. ferrous metal, by pickling with organic acids and subsequent treatment with oxidizing and/or reducing substances, which comprises:

(a) Cleaning the plant with organic acids forming soluble complexes with iron in the pickling solution at pH values between about 2 and about 9 and at temperatures between about 50 and about 200° C.

(b) Converting the iron (II) formed in stage (a) into iron (III) with oxidizing substances at pH values above 6, preferably between 6.5 and 7.5, and at temperatures of 20–100° C., preferably 40–60° C., and (c) Enhancing the formation of a protective layer on the surfaces of the plant at pH values between 6 and 10, preferably 7 and 8, and at temperatures of 20–100° C., by means of hydrazine in the presence of reaction accelerators, e.g. methylene-blue and/or complex heavy metal cyanides.

Our invention offers the possibility of combining in an advantageous manner the pickling operation and the formation of a firmly adhering protective layer in boiler plants. Both operations can be effected in the same medium merely by the stepwise addition of the necessary chemicals. Whereas the prior art processes require at least 50 hours and temperatures of more then 250° C. for producing protective layers, the process according to the invention allows of producing protective layers within a few hours and at low temperatures.

The cleaning and pickling of the surface can be accomplished according to the invention with organic carboxylic acids which are capable of forming soluble complexes with heavy metals. For this purpose, aliphatic and aromatic hydroxy carboxylic acids and keto carboxylic acids can be used. Preference is given to aliphatic hydroxy carboxylic acids with more than 2 carbon atoms, preferably 2–8 carbon atoms, e.g. citric acid, tartaric acid, lactic acid, glycolic acid, $\beta$-hydroxy propionic acid, gluconic acid, oxalacetic acid and malic acid as well as esters thereof, preferably lower alkyl esters or salts thereof with ammonia, amines, or alkanol amines. The ortho-substituted hydroxy carboxylic acids, e.g. salicyclic acid, are especially suitable as aromatic hydroxy carboxylic acids. Besides, there can be used the aldehyde and keto carboxylic acids, in particular those showing a tendency of enol formation, e.g. glyoxalic acid, pyroracemic acid, acetoacetic acid, dihydroxy maleic acid, and dihydroxy tartaric acid. The aforesaid carboxylic acids are employed in general in form of 1–30% aqueous solutions.

The process according to the invention is generally carried out at pH values of 2–9 and preferably under conditions under which the initially acidic pH value is adjusted to an approximately neutral pH value in the range of about 6.5 and about 7.5 towards the end of the pickling process when the rate of dissolution of the iron or complex formation progresses.

It is of particular advantage to use the aforesaid organic carboxylic acids, the salts or esters thereof in combination with complex-forming amino carboxylic acids. The complex-forming amino carboxylic acids may be substituted by alkyl, amino-alkyl-, aryl or phenyl and/or alkylene carboxylic acid radicals. Thus, for example glycine, ethylene diamine-tetra-acetic acid, and nitrilo-triacetic acid can be used. The imido-sulfonic acid can also be employed in the combination. These combinations allow of adjusting a medium which is distinguished by an especially high complex-forming potential, while the stability of the complexes obtained is good even at high temperatures.

Mixtures of approximately equal parts of citric acid, $\beta$-hydroxy acetic acid, gluconic acid and ethylene diamine tetra-acetic acid are especially advantageous for the purpose of the invention. When using this combination concentrations of the mixture of about 10 g./l. are sufficient to achieve good results; this is in contrast to the use of individual hydroxy carboxylic acids. It is frequently possible to obtain a sufficient effect even by the use of smaller quantities. The quantity of the pickling material is to be chosen in proper relation to the thickness of the scale layer. In general the process is conducted at temperatures between 60 and about 200° C. The removal of iron is far below 20 g./m.² and in general reaches values only of 2–2.5 g./m.². In many cases it is advisable to add to the pickling agents inhibitors, e.g. nitrogen bases, such as quinoline; oxyethylated fatty acid amines, such as stearyl amines or similar amines of fatty acid; substituted alkanol amines, such as triethanol amine; thiourea derivatives, such as diphenyl thiourea, aromatic sulfoxides, alcohols of the acetyl series, such as butine-2-diol-1,4 or oxyethylated resin amines, such as oxyethylated colophony in order to keep the removal of iron as low as possible.

The cleaning operation with the pickling agents is followed by an oxidation step. For this purpose one or more oxidation agents which simultaneously exhibit a passivating action on the iron surfaces are added to the solution containing the pickling agent at pH values above 6, preferably between 6.5 and 7.5. Suitable oxidation agents include water-soluble nitrites, nitrates, chromates, bichromates, molybdates, tungstates, bromates, hypobromites and/or chlorates. Preferably there are used the alkaline salts, and, if possible, the ammonium compounds. As a rule quantities below 5 g./l., preferably 2–3 g./l., are employed. The quantities of the oxidation agents are to be chosen so that all the iron(II) ions present are converted into iron(III). In the oxidation step it is of importance that, besides the additional dissolution of loosely adhering iron oxides by an enhanced complex-forming potential of the complex-forming substances as compared with trivalent iron, a layer of $\gamma$-$Fe_2O_3$ or the corresponding oxide hydrates is formed or preserved on the iron surfaces. What is set forth above with respect to the main constituent of the material used for building the plants, i.e. iron, applies to the alloying constituents, e.g. chromium and manganese, too.

The oxidising and passivating treatment is generally conducted at temperatures of 20–100° C., preferably 40–60° C. After finishing the oxidation step which is indicated by the consumption of the oxidizing agent the formation of a protective layer firmly adhering to the iron surface is enhanced in the third processing step by the addition of hydrazine in admixture with reaction accelerators. Suitable reaction accelerators for the purpose of the invention include methylene-blue, complex heavy metal cyanides, particularly the alkali and ammonium complexes of the copper, cobalt and nickel cyanide as well as mixtures of the two activators. When using activated hydrazine the treatment can be performed at temperatures below 100° C., the magnetite protective layer being formed within a very short time interval. The hydrazine is used in quantities of 50–100 mg./l. of $N_2H_4$, methylene-blue in quantities of 1–10 mg./l., preferably 3–5 mg./l. and the complex cyanides in quantities of 0.5–5 mg./l. The hydrazine is generally employed in form of 24% hydrazine hydrate.

The process according to the invention allows of producing firmly adhering protective layers in boiler plants and pipe systems in a single working step without replacing the reaction medium itself. Besides a high economy of time achieved according to the invention—no need for in operation of the plant for a prolonged period of time—the process of the invention is distinguished from previously known processes in that water is saved to a considerable extent, since scavenging with completely desalted water has to be performed only one, i.e. after the entire treatment.

The invention is further illustrated by the following examples without being restricted thereto.

Example 1

An aqueous citric acid solution (3%) is recycled at 90° C. through a pipe system; upon addition of a pickling scale the following values are obtained: amount of scale: 100 g./m.²; volume surface ratio 20 l./m.² of scaled surface area.

After about 12 hours the metal surface is clean and the iron content of the solution amounts to 4 g. of Fe/l. The pH value is adjusted at about 9 by means of an ammonium hydroxide solution to which is added 0.2–0.3% sodium nitrate at a temperature of 40–50° C. After about 4 hours at approximately constant temperature and a pH value of about 9 a clean passivated surface is obtained and the solution is discharged. Any further contact with oxygen-containing water is to be avoided, since otherwise corrosion occurs. Then follows scavening with completely desalted water until a conductivity is obtained which corresponds to the normal boiler operation, which requires in general a quantity 5–6 times that of the circulation volume. The protective layer is substantially treated with completely desalted water with the addition of hydrazine hydrate at temperatures above 250° C., a reaction period of at least 50 hours being necessary to produce a protective layer. The total treatment takes about 100 hours.

Example 2

Water heated to 90° C. is recycled through a boiler tube (13 CrMo 44); total amount of water 10 l. By adding pickling scale the following conditions which are similar to those prevailing in practice are obtained. Volume: surface ratio 20 l./m.$^2$ of the scaled surface area. Quantity of scale 100 g./m.$^2$ as $Fe_2O_3$.

The pH value is adjusted at about 4 by means of a synergistical mixture of 0.2% glycolic acid, 0.075% ethylene diamine tetraacetic acid, 0.05% glyconic acid and 0.5% citric acid with the addition of ammonium hydroxide. This pH value is controlled by means of a pH recording means. The solution is continuously recycled at constant temperature. Within 5 hours the pH value rises to 7–7.1, while the solution becomes green. The solution has an iron content of 3.9 g./l. The removal of iron by corrosion amounts to about 1 g./m.$^2$ when disregarding the scale layer. The pickling solution is then cooled down to about 40–60° C. while continuously recycling. After this temperature has been reached a sodium nitrite solution (25%) is added in such a quantity that a $NaNO_2$ concentration of 0.3% is obtained in the entire cycle. The solution assumes a brown-yellow coloration, the pH value rises to about 7.5. Samples of the same material show that the initial grey-black layer consisting partially of $Fe_2O_3$ and partially of oxides of the alloying constituents, is substantially removed. After the evolution of nitrogen resulting from the reduction of nitrite by the bivalent iron has subsided, hydrazine hydrate with activators (100 mg./l. $N_2H_4$ + 5 mg./l. methylene blue + 5 mg./l copper cyanide in form of $Na_3[Cu(CN)_4]$) is added. After recycling for 2 hours the solution is discharged and the boiler tube is scavenged with water. The entire pickling and passivating operation takes about 24 hours.

We claim:

1. Process for the production of protective layers on the walls surfaces of water and steam containing plants, which wall surfaces are substantially composed of ferrous metal exposed to contact with at least one of water and steam, which comprises pickling such wall surface with oxidizing and reducing substances by the steps of:
    (a) cleaning such wall surface by contact thereof with a pickling solution containing an organic acid capable of forming a soluble complex with iron in such pickling solution at a pH-value between about 2 and 9 and at a temperature between about 50 and 200° C.,
    (b) converting the iron (II) thereby formed on said wall surface in step (a) into iron (III) at a pH-value above 6 and at a temperature between about 20 and 100° C. by contact of said wall surface with an oxidizing substance thereafter added to said same pickling solution already containing said organic acid, and
    (c) enhancing the formation of such protective layer on said wall surface at a pH-value between about 6 and 10 and at a temperature between about 20 and 100° C. by contact of said wall surface with hydrazine and a reaction accelerator selected from the group consisting of methylene blue and complex heavy metal cyanides thereafter also added to said same pickling solution.

2. Process according to claim 1, wherein in step (a) an organic acid is used which is selected from the group consisting of hydroxy group-containing aliphatic and aromatic carboxylic acids, and the corresponding esters and salts thereof.

3. Process according to claim 1, wherein in step (a) organic acid is used which is selected from the group consisting of amino carboxylic acids forming complexes with heavy metals, the corresponding alkyl, amino alkyl, and aryl-substituted acids thereof, and alkylene carboxylic acids.

4. Process according to claim 1, wherein in step (a) mixtures of organic acids are used.

5. Process according to claim 1, wherein in step (b) an oxidizing substance is used which is selected from the group consisting of water-soluble nitrites, nitrates, chromates, bichromates, molybdates, tungstates, bromates, hypobromites, and chlorates.

6. Process according to claim 1, wherein in step (b) the conversion of the iron (II) into iron (III) is performed at a pH-value between 6.5 and 7.5.

7. Process according to claim 1, wherein in step (b) the conversion of the iron (II) into iron (III) is performed at a temperature between 40 and 60° C.

8. Process according to claim 1, wherein in step (c) the protective layer is formed at a pH-value between 7 and 8.

9. Process according to claim 1, wherein in step (c) the hydrazine is used in quantities of 50 to 100 mg./l., the methylene blue is used in quantities of 1 to 10 mg./l., and the water-soluble complex heavy metal cyanides are used in quantities of 0.5 to 5 mg./l.

10. Process according to claim 1, wherein in step (a) the organic acid is used in admixture with an inhibitor.

11. Process according to claim 10, wherein said inhibitor is selected from the group consisting of nitrogen bases, oxyethylated fatty acid amines, substituted alkanol amines, thioureas, aromatic sulfoxides, oxyethylated resin amines, and alcohols of the acetylene series.

References Cited

UNITED STATES PATENTS

| 2,041,545 | 5/1936 | Heussner. | |
| 2,678,289 | 5/1954 | Noble | 134—3 |
| 2,718,480 | 9/1955 | Lauer | 134—2 |
| 3,272,738 | 9/1966 | Pitzer et al. | 134—3 |

MORRIS O. WOLK, *Primary Examiner.*

M. D. BURNS, *Assistant Examiner.*